Patented Nov. 2, 1937

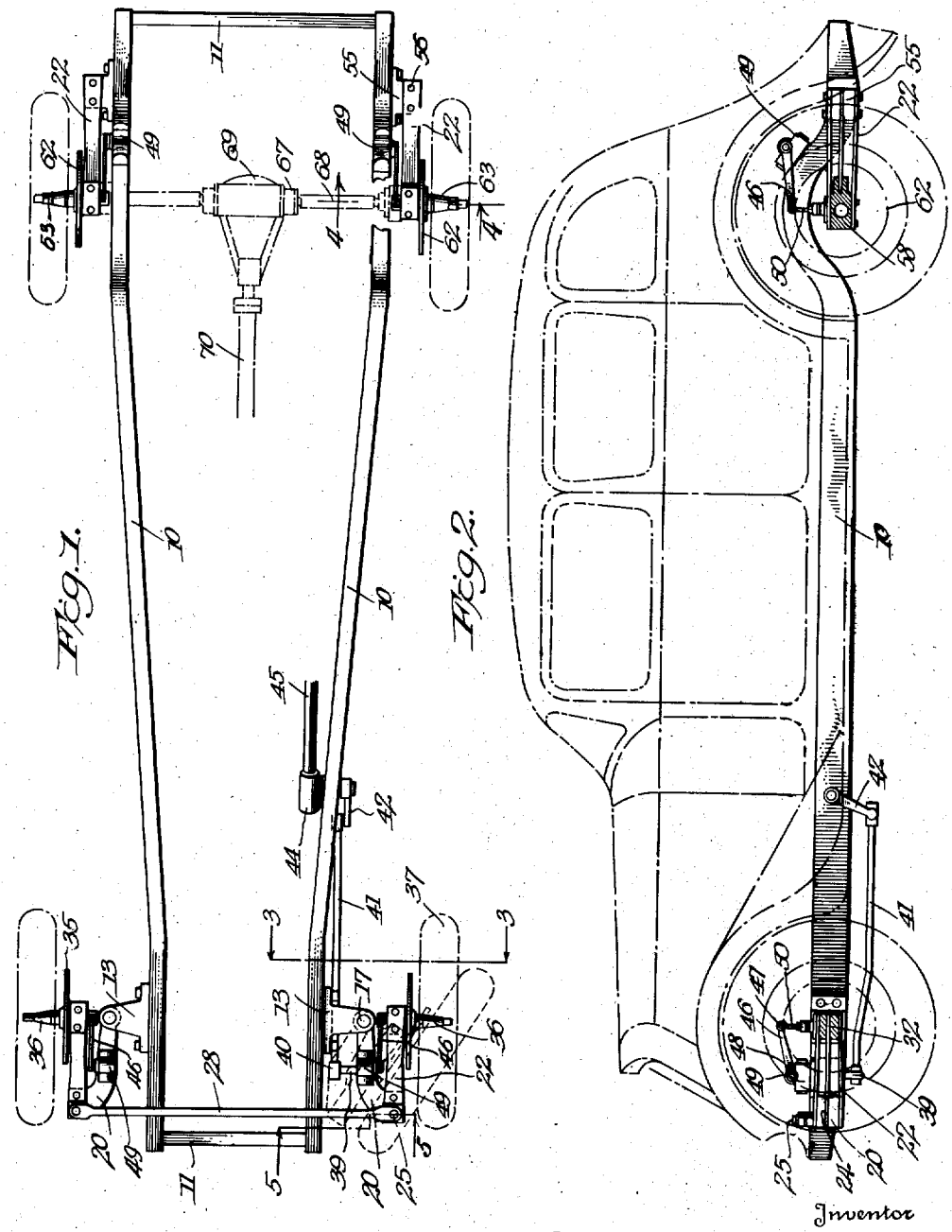

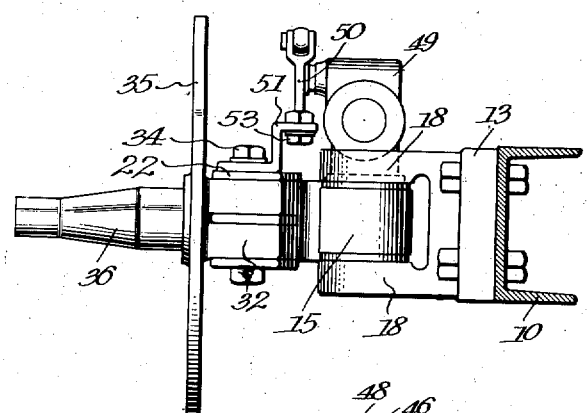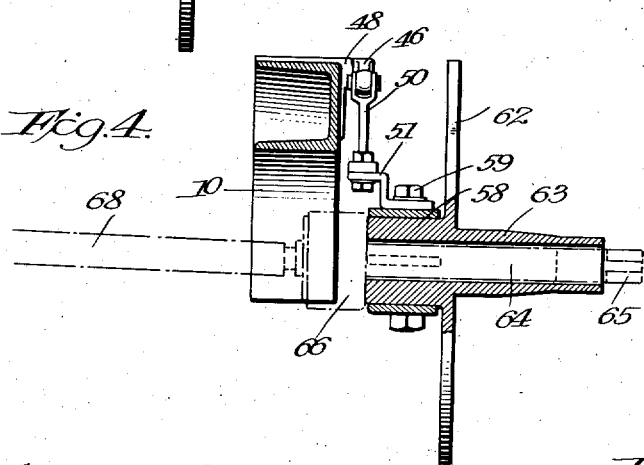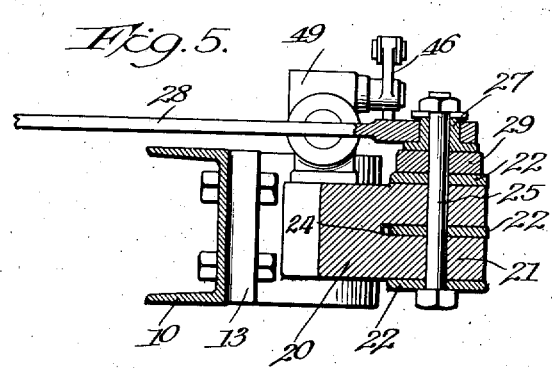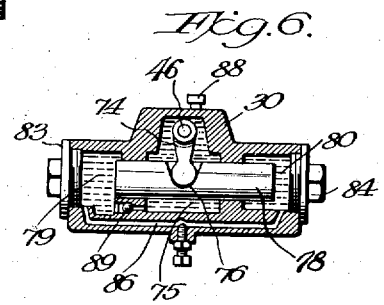

2,097,445

UNITED STATES PATENT OFFICE 2,097,445

WHEEL SUSPENSION FOR MOTOR VEHICLES

John M. Christman, Detroit, Mich., assignor to Packard Motor Car Company, Detroit, Mich., a corporation of Michigan Application March 11, 1933, Serial No. 660,416

10 Claims. (Cl. 280—124)

This invention relates to motor vehicles and more particularly to improvements in the vehicle frame and wheel suspensions.

It is the principal object of the invention to provide a construction in which the road wheels are independently sprung and in which the support for the steerable road wheels is carried by the vehicle frame, so that the entire steering mechanism may be supported on the frame and is thus not subjected to displacement as the result of relative movement in a vertical sense of the road wheels and the frame when the vehicle is driven on an uneven road bed. Thus it is a feature of the invention that the usual steering knuckle or the equivalent thereof is carried on the vehicle frame and therefore partakes of no movement with respect to the frame other than the usual swinging movement in a substantially horizontal plane for steering purposes.

It is a further object of the invention to provide in a construction of this character yielding means acting between the vehicle frame and the steerable road wheel assembly, or in the case of the steerable road wheels, between the steering knuckle and the steerable road wheel assembly, for resisting vertical movement of the latter, this yielding means being preferably of the leaf spring type and comprising the principal or sole support for the wheel assembly.

A more specific object of the invention is the provision in connection with the steerable road wheels of a steering knuckle carried by the vehicle frame and having a longitudinally extending arm, and a longitudinally extending leaf spring disposed adjacent to and laterally of the arm and carried by the latter, this leaf spring serving to support the road wheel. This construction affords adequate support for the vehicle and is at the same time extremely compact as measured in a direction transversely of the vehicle. It is a feature of the invention that a shock absorbing device for resisting sudden relative movement of the vehicle wheels and frame may be provided, the devices associated with the front wheels of the vehicle being carried on the steering knuckle.

Further objects and features of the invention will be more apparent from the following description taken in connection with the accompanying drawings, in which Figure 1 is a plan view of a motor vehicle chassis illustrating one embodiment of the invention;

Figure 2 is a side elevation of a motor vehicle, certain of the parts being shown in section;

Figure 3 is a section on the line 3—3 of Figure 1;

Figure 4 is a section on the line 4—4 of Figure 1;

Figure 5 is a section on the line 5—5 of Figure 1; and

Figure 6 is a sectional view illustrating one form of shock absorbing device which may be used to retard sudden relative movement of the road wheels and vehicle frame.

While the embodiment of the invention shown in the drawings is described herein in detail, it will be understood that specific language is used for the purpose of convenience and to facilitate an understanding of the invention and that no limitation of the scope of the invention is thereby intended, such alterations of the construction being contemplated as fall within the language of the claims appended hereto.

Referring now to the drawings, it will be observed that the vehicle frame is illustrated as comprising the conventional side frame members 10 and the cross frame members 11, the precise construction of this frame forming no part of the present invention.

Secured rigidly to each side frame member adjacent its forward end is a bracket 13, these brackets extending laterally of the frame and constituting supports on which the steering knuckles may be mounted for swinging movement in a substantially horizontal plane for the purpose of steering the vehicle. Thus each knuckle indicated at 15 may be carried by the conventional king pin 17, the bracket 13 being provided with a forked portion 18 adapted to receive the knuckle and the king pin passing through this forked portion and through the knuckle and being secured against longitudinal displacement therein in any convenient manner.

The pivotal support for the knuckle is shown in a simple manner since the precise construction thereof is not an important feature of the invention. For instance, while the axis of the king pin is illustrated as substantially vertical, it will be understood that in practice this axis would be inclined to the vertical to afford the usual caster effect. Furthermore, although the term "steering knuckle" is used for convenience, this term is intended to cover any device or member supported for movement in a horizontal or nearly horizontal plane and adapted to carry a road wheel, so that the vehicle may be steered by movement of the knuckle.

The steering knuckle 15 is provided with a forwardly directed substantially longitudinally extending arm 20, the free end 21 of this arm serving as a support for one or more rearwardly extending leaf springs 22. Thus by reference to Figure 5 of the drawings, it will be seen that three such springs are shown, the intermediate spring being received within a slot 24 formed in the steering knuckle arm and the upper and lower springs being disposed in engagement with the upper and lower surfaces respectively of the steering knuckle arm. A bolt 25 may extend through the arm and through the leaf springs to clamp the latter in position on the arm. Preferably this bolt also functions as a support for a bushing 27 which receives one end of the usual cross connecting rod 28, the latter extending transversely of the vehicle and serving to connect the two steering knuckles for simultaneous swinging movement in a substantially horizontal plane for steering purpose, a spacing member 29 being interposed between the bushing 27 and the upper leaf spring 22.

At their rearward ends and at a point substantially opposite the king pin 17, the leaf springs are received in a wheel assembly supporting member 32, connection between these leaf springs and the supporting member being effected in a manner similar to that described above. Thus the member 32 may be slotted as indicated at 33 to receive the intermediate leaf spring, the upper and lower leaf springs engaging the upper and lower surfaces respectively of the member 32. A bolt 34 passing through the leaf springs and the member 32 serves to clamp these parts rigidly together.

Formed integrally with or carried rigidly by the member 32 is a plate 35 which may serve as a support for the usual brake backing plate (not shown), the member 32 also carrying the wheel spindle 36 on which the steerable road wheel 37 is journalled in the conventional manner.

It will be observed from the construction thus far described that the structure on opposite sides of the vehicle for supporting the steerable road wheels is identical, the steering knuckles swinging in a substantially horizontal plane and the leaf springs flexing in a substantially vertical plane when an obstruction is encountered by the road wheels to afford the usual relative movement between the road wheels and the vehicle frame. The steering knuckle at the left hand side of the vehicle is provided with a steering arm 39 having an articulated connection at 40 with the usual drag link 41, this steering arm being rigidly secured to or formed integrally with the underside of the steering knuckle and extending inwardly therefrom.

Adjacent its rear end the drag link is connected with the steering arm 42 which is in turn secured to a shaft 43 extending into the usual steering gear casing 44, located at the lower end of the steering column 45, the gearing within the casing being operable from the usual steering hand wheel (not shown) to effect steering movement of the two knuckles and the associated road wheels. Thus the arrangement is such that the steering apparatus is supported solely by and movable with the frame as distinguished from more conventional structures, such as the usual rigid axle construction, in which portions of the steering apparatus partake of rising and falling movement with the road wheel, such wheel movement thereby tending to interfere with proper steering action.

In order that sudden or violent relative movement of the road wheels and the vehicle frame may be resisted, a conventional shock absorber is employed, the casing 49 of this shock absorber being preferably mounted on the forwardly extending arm 20 of the knuckle 15, for instance by bolting the casing to the upper side of the arm.

A spindle 48 extending through the casing wall carries an arm 46 which is rigidly secured to the spindle and which is pivotally connected as at 47 to a rod 50. This rod is secured to and is movable with the road wheel assembly. For instance a bracket 51 may be provided with a portion interposed between the head of the bolt 34 and the upper leaf spring 22, the rod 50 being secured to the outer end of the bracket 51 by nuts 53 threaded on the rod.

It will be appreciated that when the road wheel moves vertically with respect to the frame and the knuckle, the spindle 48 which extends into the shock absorber casing 49 will be rocked, and this rocking movement will be resisted in the usual manner by the elements of the shock absorber.

Referring now to Figure 6 of the drawings in which one form of shock absorber is shown, it will be seen that the spindle 48 is provided with an arm 74, rigidly secured to the spindle and depending within the main chamber 75 of the shock absorber. The lower end of the arm 74 engages a recess 76 in a double piston 78, the latter working in cylinders 79 and 80 formed at opposite ends of the absorber casing, these cylinders being preferably closed by elements 83 and 84 which are threaded into the respective ends of the casing.

The cylinders 79 and 80 are placed in communication by a passage 86, and it will be observed that on reciprocation of the double piston 78, fluid contained within the cylinders 79 and 80 will be caused to flow back and forth through the communicating passage 86. Such flow is resisted by suitably restricting the passage, for instance a regulating device consisting of a screw threaded element arranged to block the passage to a greater or less extent may be employed.

The shock absorber casing including the chamber 75 is supplied with oil or similar fluid, a filler opening and plug 88 being provided for this purpose.

The fluid within the chamber 75 acts as a source of supply for the communicating system including the cylinders 79 and 80 and the passage 86, a one-way valve 89 communicating with the cylinder 89 and the cylinder 75 being provided to permit flow of fluid from the chamber into the cylinder only, so that the supply of oil in the cylinders is automatically replenished from time to time.

It is obvious that the specific construction of this shock absorber forms no part of the present invention and that any conventional type of shock absorber may be readily applied to the construction shown in the drawings for the purpose of resisting sudden relative movement of the road wheel assembly and the steering knuckle and vehicle frame.

The various advantages of the present invention will be apparent from the foregoing description. In addition to those which have been mentioned, it will be observed that the total unsprung weight is unusually low, with the result that the riding qualities of the vehicle are improved and the life of the vehicle tires is prolonged.

Furthermore, by reason of the manner in which the road wheel is supported, there is no canting of the wheel when an obstruction is encountered at one side of the vehicle and thus the caster angle is not altered. This reduces the tendency of the vehicle to turn to one side or the other when passing over an uneven road bed.

Referring now to the construction at the rear of the vehicle, it will be observed that the details are quite similar to those employed in connection with the steerable road wheels, the steering knuckle being replaced by a supporting member 55 which is bolted to the side frame of the vehicle, the member 55 being constructed to receive the leaf springs 22. Thus the intermediate leaf spring may extend within a slot or recess in the supporting member 55 and all three leaf springs may be retained in position by means of bolts 56 passing through the member 55 and through the leaf springs. Similarly the member 58 which supports the wheel assembly may be slotted to receive the intermediate leaf spring and all three leaf springs may be secured in position by means of a bolt 59 passing therethrough, the bracket 51, rod 50, and arm 46 being provided to connect the wheel assembly with the operating spindle 48 of the shock absorber.

The member 58 is provided with a brake backing plate supporting member 62 and a wheel spindle 63, these elements being centrally apertured to receive a driving shaft 64 having its outer end 65 extending beyond the spindle for attachment to the vehicle wheel which is journalled on the spindle 63 in the usual manner. The shaft 64 may be connected by conventional universal joints 66 and 67 and a shaft 68 to gearing within the differential housing 69, the latter being preferably carried by the frame. The propeller shaft 70 extends forwardly from the differential housing and is driven in the usual manner from the vehicle motor.

The shock absorbers for the rear vehicle wheels indicated at 49 are supported on and rigidly secured to the respective side frame members and thus serve to resist sudden relative movement in a substantially vertical plane of the rear wheels and the frame.

It will be appreciated that the spring suspension system disclosed herein is located further from the center line of the car and further forward than in conventional designs. Accordingly, the mass of the suspension offers a greater resistance to jolts and vibration ordinarily transmitted through the springs. Furthermore, side sway on rounding a curve is substantially eliminated owing to the fact that the springs act at points located adjacent the road wheels, this side sway in conventional constructions being largely the result of the location of the springs much nearer the center line of the vehicle.

While the construction of the leaf springs may be varied to a considerable extent, it is preferred that an arrangement involving the spacing of the leaves as illustrated in the drawings be employed since this construction offers much greater resistance to torsional stresses than does the conventional leaf spring assembly, a feature of considerable importance since the road wheel is supported laterally of the springs. It is also preferable to so proportion the springs that the resistance to flexure at each end thereof is greater than at intermediate points to compensate for the greater bending moments at the ends of the springs. The desired result may obviously be accomplished by the use of springs having greater width or thickness adjacent each end, the size of the springs at various points being determined substantially in accordance with the varying bending moments to which the different portions of the spring are subjected in practice and secured rigidly to said road wheel assembly.

Having thus described the invention, what is claimed as new and desired to be secured by Letters Patent is:

1. In a motor vehicle, the combination with a vehicle frame, of a steerable road wheel, means supporting said road wheel on said frame for substantially horizontal steering movement and for substantially vertical movement in response to irregular road conditions with respect to said frame, said means consisting of a steering knuckle and longitudinally extending leaf spring means connected between said knuckle and said wheel for steering the latter and for resisting vertical movement thereof, and manually operable steering apparatus supported solely by and movable with said frame and operatively connected with said means for effecting steering movement of said wheel.

2. In a motor vehicle, the combination with a vehicle frame, of a road wheel assembly, means carried by said frame for supporting said road wheel assembly on said frame for vertical movement with respect thereto, said means comprising a plurality of leaf springs extending generally longitudinally of the vehicle and lying in superposed and contiguous but spaced relation, and a steering knuckle carried by said frame, said leaf springs being connected between and affording the sole connection between said knuckle and said road wheel assembly.

3. In a motor vehicle, the combination with a vehicle frame, of a steering knuckle carried by said frame, a steerable road wheel, means for supporting said road wheel on said knuckle for substantially vertical movement only with respect thereto, said means including a leaf spring for resisting vertical movement of said wheel, said leaf spring acting between said knuckle and said wheel and lying in a vertical plane extending substantially longitudinally of the vehicle, and a shock absorber carried by said knuckle and connected with said wheel for resisting sudden vertical movement of the latter.

4. In a motor vehicle, the combination with a vehicle frame, of a road wheel assembly, means carried by said frame for supporting said road wheel assembly on said frame for vertical movement with respect thereto independently of the remaining vehicle road wheels, said means comprising a leaf spring extending generally longitudinally of the vehicle, said leaf spring being secured at one end to said frame and being secured at the other end to said road wheel assembly, and a shock absorber carried by said frame and connected with said wheel so as to act directly between the frame and said wheel assembly for resisting sudden vertical movement of the latter.

5. In a motor vehicle, the combination with a vehicle frame, of a steering knuckle carried by said frame, a steerable road wheel, means for supporting said road wheel on said knuckle for substantially vertical movement only with respect thereto, said means including a longitudinally extending leaf spring for resisting vertical movement of said wheel, said knuckle having a longitudinally extending arm disposed adjacent and laterally of said leaf spring, and means connecting said spring with said road wheel and with the free end of said arm.

6. In a motor vehicle, the combination with a vehicle frame, of a steering knuckle carried by said frame and provided with a forwardly extending arm, a plurality of leaf springs secured to the forward end of said arm and extending rearwardly therefrom and flexing in a substantially vertical plane, and a road wheel assembly carried by the rearward end of said springs laterally of and adjacent said knuckle.

7. In a motor vehicle, the combination with a vehicle frame, of a steering knuckle carried by said frame and provided with a forwardly extending arm, a plurality of leaf springs secured to the forward end of said arm and extending rearwardly therefrom and flexing in a substantially vertical plane, a road wheel assembly carried by the rearward end of said springs laterally of and adjacent said knuckle, and a shock absorber carried by said knuckle and connected with said wheel assembly to resist sudden flexure of said springs.

8. In a motor vehicle, the combination with a vehicle frame, of a steering knuckle pivotally carried by said frame, a steerable road wheel, and means for supporting said road wheel on said knuckle for substantially vertical movement only with respect thereto, said means including a leaf spring for resisting vertical movement of said wheel, said leaf spring being connected to said knuckle and to said wheel and lying in a vertical plane extending substantially longitudinally of the vehicle, the axis of said road wheel being disposed in substantial transverse alignment with the pivot of said steering knuckle.

9. In a motor vehicle, the combination with a vehicle frame, of a road wheel assembly, means carried by said frame for supporting said road wheel assembly on said frame for vertical movement with respect thereto, said means comprising a plurality of parallel spring leaves lying in superposed and contiguous but spaced relation, and a steering knuckle carried by said frame, said spring leaves being rigidly connected with both said knuckle and said wheel assembly and affording the sole connection between said knuckle and said road wheel assembly.

10. In a motor vehicle, the combination with a vehicle frame, of a steerable road wheel, means supporting and guiding said road wheel on said frame for substantially horizontal steering movement and for substantially vertical movement in response to irregular road conditions with respect to said frame, said means including a longitudinally extending leaf spring means supported for steering movement with said wheel for resisting vertical movement of the wheel and guiding the wheel in such movement, and manually operable steering apparatus supported solely by and movable with said frame and operatively connected with said means for effecting steering movement of said wheel.

JOHN M. CHRISTMAN.

CERTIFICATE OF CORRECTION.

Patent No. 2,097,445.   November 2, 1937.

JOHN M. CHRISTMAN.

It is hereby certified that error appears in the printed specification of the above numbered patent requiring correction as follows: Page 3, second column, lines 3 and 4, strike out the words "and secured rigidly to said road wheel assembly"; and that the said Letters Patent should be read with this correction therein that the same may conform to the record of the case in the Patent Office.

Signed and sealed this 8th day of February, A. D. 1938.

(Seal)

Henry Van Arsdale,
Acting Commissioner of Patents.

a vehicle frame, of a steering knuckle carried by said frame and provided with a forwardly extending arm, a plurality of leaf springs secured to the forward end of said arm and extending rearwardly therefrom and flexing in a substantially vertical plane, and a road wheel assembly carried by the rearward end of said springs laterally of and adjacent said knuckle.

7. In a motor vehicle, the combination with a vehicle frame, of a steering knuckle carried by said frame and provided with a forwardly extending arm, a plurality of leaf springs secured to the forward end of said arm and extending rearwardly therefrom and flexing in a substantially vertical plane, a road wheel assembly carried by the rearward end of said springs laterally of and adjacent said knuckle, and a shock absorber carried by said knuckle and connected with said wheel assembly to resist sudden flexure of said springs.

8. In a motor vehicle, the combination with a vehicle frame, of a steering knuckle pivotally carried by said frame, a steerable road wheel, and means for supporting said road wheel on said knuckle for substantially vertical movement only with respect thereto, said means including a leaf spring for resisting vertical movement of said wheel, said leaf spring being connected to said knuckle and to said wheel and lying in a vertical plane extending substantially longitudinally of the vehicle, the axis of said road wheel being disposed in substantial transverse alignment with the pivot of said steering knuckle.

9. In a motor vehicle, the combination with a vehicle frame, of a road wheel assembly, means carried by said frame for supporting said road wheel assembly on said frame for vertical movement with respect thereto, said means comprising a plurality of parallel spring leaves lying in superposed and contiguous but spaced relation, and a steering knuckle carried by said frame, said spring leaves being rigidly connected with both said knuckle and said wheel assembly and affording the sole connection between said knuckle and said road wheel assembly.

10. In a motor vehicle, the combination with a vehicle frame, of a steerable road wheel, means supporting and guiding said road wheel on said frame for substantially horizontal steering movement and for substantially vertical movement in response to irregular road conditions with respect to said frame, said means including a longitudinally extending leaf spring means supported for steering movement with said wheel for resisting vertical movement of the wheel and guiding the wheel in such movement, and manually operable steering apparatus supported solely by and movable with said frame and operatively connected with said means for effecting steering movement of said wheel.

JOHN M. CHRISTMAN.

CERTIFICATE OF CORRECTION.

Patent No. 2,097,445.   November 2, 1937.

JOHN M. CHRISTMAN.

It is hereby certified that error appears in the printed specification of the above numbered patent requiring correction as follows: Page 3, second column, lines 3 and 4, strike out the words "and secured rigidly to said road wheel assembly"; and that the said Letters Patent should be read with this correction therein that the same may conform to the record of the case in the Patent Office.

Signed and sealed this 8th day of February, A. D. 1938.

(Seal)
Henry Van Arsdale,
Acting Commissioner of Patents.

CERTIFICATE OF CORRECTION.

Patent No. 2,097,445.  November 2, 1937.

JOHN M. CHRISTMAN.

It is hereby certified that error appears in the printed specification of the above numbered patent requiring correction as follows: Page 3, second column, lines 3 and 4, strike out the words "and secured rigidly to said road wheel assembly"; and that the said Letters Patent should be read with this correction therein that the same may conform to the record of the case in the Patent Office.

Signed and sealed this 8th day of February, A. D. 1938.

(Seal)

Henry Van Arsdale,
Acting Commissioner of Patents.